United States Patent [19]
Schambre et al.

[11] Patent Number: 6,149,219
[45] Date of Patent: Nov. 21, 2000

[54] DROPGATE CARGO SUPPORT SYSTEM

[75] Inventors: John Schambre, Canton; Joseph J. Alongi, New Baltimore; David L. Garber, Canton; Michael D. Tesauro, Wixom, all of Mich.

[73] Assignee: DaimlerChrysler Corporation, Auburn Hills, Mich.

[21] Appl. No.: 09/342,547

[22] Filed: Jun. 29, 1999

[51] Int. Cl.[7] .................................................. B62D 25/00
[52] U.S. Cl. ...................................... 296/57.1; 296/26.11
[58] Field of Search ............................. 296/57.1, 26.08, 296/26.09, 26.1, 26.11

[56] References Cited

U.S. PATENT DOCUMENTS

| | | |
|---|---|---|
| 824,779 | 7/1906 | Clark . |
| 2,852,303 | 9/1958 | Hopson . |
| 3,900,118 | 8/1975 | Kellogg . |
| 4,389,067 | 6/1983 | Rubio . |
| 4,938,403 | 7/1990 | Cortelli . |
| 5,120,102 | 6/1992 | Cumbie . |
| 5,320,397 | 6/1994 | Peterson et al. . |
| 5,468,037 | 11/1995 | Peterson et al. . |
| 5,468,038 | 11/1995 | Sauri ..................................... 296/57.1 |
| 5,478,130 | 12/1995 | Matulin et al. . |
| 5,741,039 | 4/1998 | Habdas . |
| 5,755,480 | 5/1998 | Bryan ............................... 296/57.1 X |
| 5,806,907 | 9/1998 | Martinus et al. ................ 296/57.1 X |
| 5,857,724 | 1/1999 | Jarman ............................. 296/57.1 X |
| 5,868,449 | 2/1999 | Hitchcock ........................... 296/57.1 |
| 5,918,925 | 7/1999 | Perrin ............................... 296/57.1 X |
| 5,997,066 | 12/1999 | Scott ................................. 296/57.1 X |
| 6,007,127 | 12/1999 | Garofalo ........................... 296/57.1 X |

*Primary Examiner*—Joseph D. Pape
*Attorney, Agent, or Firm*—James R. Yee

[57] ABSTRACT

A cargo support system for a motor vehicle includes a 'U'-shaped bar rotatable from a stowed position to an operable position. The 'U'-shaped bar preferably has a pair of end members rotatably coupled to the dropgate of the motor vehicle and a cross member interconnecting the pair of end members. A locking hinge mechanism is operable to secure the U-shaped bar in either the stowed or operable position.

20 Claims, 2 Drawing Sheets

DROPGATE CARGO SUPPORT SYSTEM

BACKGROUND OF THE INVENTION

1. Technical Field

The present invention generally relates to motor vehicles. More particularly, the present invention pertains to a mechanism for increasing the hauling capacity of a cargo-carrying vehicle.

2. Discussion

The bed area of cargo-carrying vehicles often includes protrusions over the wheels, i.e. wheel wells. These wheel wells prevent the bed area from being completely flat, and they can limit the effective hauling capacity of the vehicle. Operators of cargo-carrying vehicles such as pickup trucks often have a need to temporarily create a completely flat surface in the vehicle bed area. It is known in the art to insert wooden slats across the interior of the bed area, thereby creating a horizontal planar supporting surface above the vehicle wheel wells. Cargo-carrying vehicles and cargo-carrying vehicle bed liners have been designed to accommodate these slats. Occasionally, however, operators have a need to transport cargo that is longer than the bed. For example, an operator hauling large sheets of plywood or sheet rock may need to transport items that extend further than the dropgate of the vehicle. These operators would benefit from an extension of the horizontal planar supporting surface area. In particular, operators would benefit from an extension that could be utilized with the dropgate in a lowered position.

Currently, attempts to haul cargo, with the dropgate open, on a flat surface, such as one created by the previously mentioned wooden slats, must be limited to cargo that does not extend far beyond the support provided by the rearward most slat. If cargo extends much further than this point, several problems arise. First, the article may have a tendency to tip out of the bed of the truck, thereby creating a potential to lose the article. Second, more fragile cargo, such as particle board or sheet rock, may warp or break if not well supported on both ends and in the middle.

Existing structures have been designed for the purpose of extending the cargo space of trucks and other vehicles. However, these devices have certain disadvantages. In some cases, one end of the cargo is propped against a dropgate or a protective bar secured to the top of the dropgate in the raised position. These designs do not provide a substantially horizontal planar supporting surface and may put undue stress on the dropgate and its associated hinges and locks which are not typically designed to support cargo. Moreover, fragile cargo being transported in this manor could easily warp due to the lack of support in the middle of the cargo. In other cases, structures are installed into the bed area of the vehicle and hinder the convenient transportation of normal cargo. In still other cases, cargo is loaded by sliding it across the dropgate or across a beam. This may cause damage to the cargo or to the dropgate.

SUMMARY OF THE INVENTION

It is therefore an object of the present invention to provide a dropgate cargo support system that can be utilized with the dropgate of a cargo-carrying vehicle in a lowered position.

It is another object of the present invention to provide a dropgate cargo support system that is capable of transporting and effectively supporting cargo that extends beyond the bed of a cargo-carrying vehicle.

It is a further object of the present invention to provide a dropgate cargo support system integrally packaged within the dropgate of a cargo-carrying vehicle.

It is an additional object of the present invention to provide a dropgate cargo support system that defines a substantially horizontal planar supporting surface.

It is yet another object of the present invention to minimize cargo damage generated when utilizing a dropgate cargo support system during the loading and unloading of a cargo-carrying vehicle.

According to the present invention, a fold out dropgate extender for a motor vehicle includes a hinging 'U' shaped bar that pivots from a stowed position to an operable position and that utilizes a pin or locking hinge to lock into its operative positions. The dropgate extender can be set either to the stowed position or to the operable position. Rollers are attached to the cross member of the 'U' shaped extender to accommodate the easy and damage-free loading and unloading of cargo.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
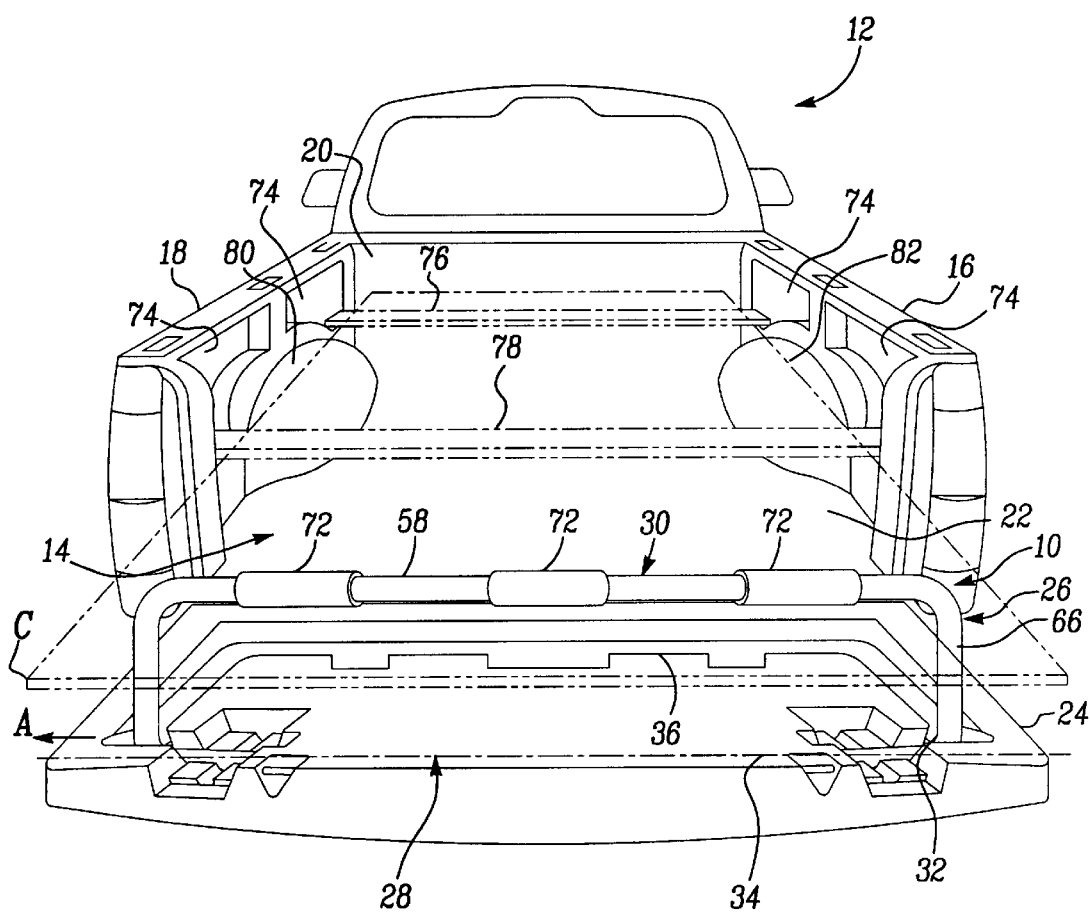
FIG. 1 is a perspective view of a portion of a motor vehicle illustrating the dropgate cargo support system of the present invention in an operable position.

With reference to the drawings, a dropgate cargo support system of the present invention is generally identified at reference numeral 10. The support system 10 is shown operatively associated with an exemplary motor vehicle 12. In the preferred embodiment, the vehicle 12 is a pickup truck having a cargo bed 14, a first sidewall 16, a second sidewall 18, a back wall 20, a bed floor 22, and a dropgate 24 which can be pivoted about an axis 26 from an open position to a closed position. When dropgate 24 is in the open position, an inner surface 28 of dropgate 24 is substantially coplanar with cargo bed 14.

The dropgate cargo support system 10 is illustrated to generally include one major assembly individually attached to a specially designed dropgate 24. Dropgate cargo support system 10, comprises a 'U'-shaped bar 30 rotatably connected to dropgate 24 by means of an axle 32. The 'U'-shaped bar 30 can be pivoted around an axis 34 from a closed position to the operable position. When dropgate cargo support system 10 is in a stowed position, 'U'-shaped bar 30 fits within dropgate relief 36 and is substantially coplanar with dropgate 24 and cargo bed 14. 'U'-shaped bar 30 fits within relief 36 in such a way that 'U' shaped bar 30 lays flush with dropgate inner surface 28 and cargo bed 14. This allows for the standard operation of vehicle 12 when dropgate cargo support system 10 is in its stowed position.

Figure 2:
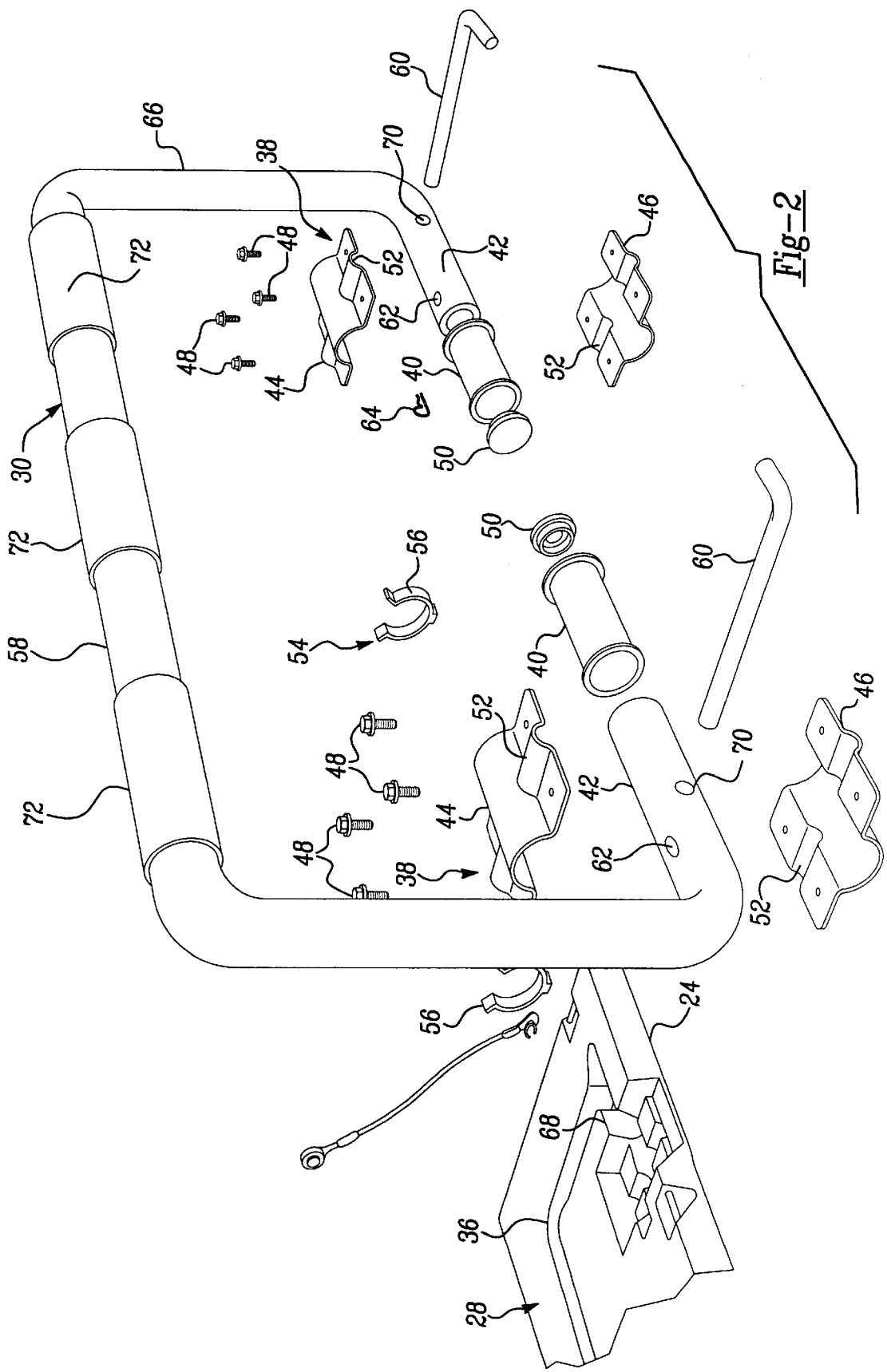
FIG. 2 is an exploded perspective view of an attachment scheme for the dropgate cargo support system of the present invention.

With particular reference to FIG. 2, a 'U'-shaped bar 30 is operably coupled to dropgate 24 at locking hinge mechanism 38. Bushings 40 are placed over bar end members 42. Locking hinge mechanism 38 includes upper hinge plate 44 and lower hinge plate 46 disposed on opposite sides of bushing 40 such that support bar 30 is pivotally supported therein. Fasteners 48 secure upper hinge plate 44 and lower locking hinge plate 46 to dropgate 24 in a way which allows 'U'-shaped bar 30 to be rotated from a stowed position to an operable position. End caps 50 are placed over the open ends of lower end members 42. Upper and lower hinge plates 44, 46 have a pin-receiving bore 52 found therethrough.

When in the stowed position, 'U'-shaped bar 30 is situated within relief 36. A latch mechanism 54 is utilized to secure bar 30 in its place. While different types of latches could be used for this purpose, a 'C'-shaped plastic catch 56 disposed within relief 36 and operable to grasp a portion of crossmember 58 is presumably preferred. More specifically, cross member 58 is locked within dropgate relief 36 by means of a pair of catches 56. When cross member 58 is locked into catches 56, 'U'-shaped bar 30 neatly fits within dropgate relief 36 and is flush with dropgate inner surface 28. Rotation of 'U'-shaped bar 30 can also be prevented by inserting locking pins 60 into first locking aperture 62 formed through end members 42 for receiving lock pins 60. Lock pins 60, when in place, are secured by pin-receiving bore 52 found in upper and lower locking hinge plates 44 and 46. A cotter pin 64 may be used to hold lock pin 60 with pin-receiving bore 52. Thus, lock pins 60 prevent 'U' shaped bar 30 from rotating. One skilled in the art will readily appreciate that catch 56 and lock pins 60 may be used alone or in combination to secure support bar 30 in the stowed position.

When dropgate cargo support system 10 is in an operative position, 'U'-shaped bar 30 is locked or pinned into a position generally perpendicular to dropgate 24 and cargo bed 14. While various mechanisms could be utilized to lock 'U' shaped bar 30 into its operative position, a mechanical locking hinge mechanism 38 is presently preferred to hold the bar in place as hereinafter described. To rotate 'U'-shaped bar 30 from a stowed position to an operable position, cotter pins 64 are removed from lock pins 60, and lock pins 60 are removed from locking hinge mechanism 38. Cross member 58 may then be lifted from catches 56. 'U'-shaped bar 30 is then rotated towards an operable position. Once U-shaped bar 30 substantially clears relief 36 formed in inner surface 28, it is shifted laterally (in the direction of arrow A shown in FIG. 1) so that first side member 66 rests against supporting surface 68. In this position, second locking apertures 70 line up with pin-receiving bore 52 in upper and lower hinge plates 44, 46, such that lock pins 60 may be inserted through second locking apertures 70 and secured in place by cotter pins 64. Thus, lock pins 60 secure 'U'-shaped bar 30 in a position substantially perpendicular to dropgate inner surface 28.

The 'U'-shaped bar 30 may be equipped with rollers 72 to prevent cargo damage during loading and unloading. These rollers 72 are free rolling and may utilize any appropriate bushing or bearing assemblies to permit rotation of rollers 72 with respect to 'U'-shaped bar 30. While three rollers are illustrated, one skilled in the art would recognize that the number of rollers may be modified to accommodate a particular usage.

To utilize the system, dropgate 24 should be in an open position (as pictured in FIG. 1). Sidewall slat pockets 74 are formed within first sidewall 16 and second sidewall 18 and are adapted to receive supporting slats 76 and 78. Slats 76, 78 rest above first and second wheel wells 80, 82 to define a supporting surface which is substantially parallel with and offset above cargo bed 14. With dropgate cargo support system 10 positioned in its operative position, as shown in FIG. 1, a cargo C (as shown in phantom) can be loaded so that it rests upon slat 76, slat 78, and 'U' shaped bar 30. Cargo C can be rolled across rollers 72 to prevent cargo damage. When cargo C is in place, it rests in a substantially horizontal position above cargo bed 14 and substantially parallel thereto.

Once cargo C is unloaded, the 'U' shaped bar 30 of the dropgate cargo support system 10 can be rotated around axis 34 and stowed within dropgate relief 36. With the dropgate cargo support system 10 in its stowed position, vehicle 12 functions as a standard pickup truck. Specifically, an operator may articulate the dropgate 24 from a closed position to an open position and vice versa without interference from the dropgate cargo support system 10. Neither will the dropgate support system hinder the loading and unloading of normal cargo.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A cargo support system for a motor vehicle, comprising:
    a cargo bed having a bed floor, a back wall, and first and second sidewalls;
    a dropgate rotatably coupled to said cargo bed and being rotatable from a closed position to an open position, said dropgate having a support surface formed therein; and
    a 'U'-shaped bar having a pair of end members, a pair of side members extending from said pair of end members and a cross member interconnecting said pair of side members, said pair of end members being operably coupled to said dropgate for relative pivotal and lateral movement;
    said 'U'-shaped bar being releasably securable in a stowed position wherein said 'U'-shaped bar is generally co-planar with said dropgate and in an operable position
wherein said 'U'-shaped bar is generally perpendicular to said dropgate and laterally displaced from said stowed position such that at least one of said pair of side members engages said support surface formed in said dropgate.

2. The cargo support system of claim 1, further including at least one roller operably supported on said cross member of said 'U'-shaped bar.

3. The cargo support system of claim 1, wherein said dropgate includes a latch grasping a portion of said cross member when said 'U'-shaped bar is in said stowed position.

4. The cargo support system of claim 1 further comprising first and second slat pockets respectively formed in said first and second sidewalls and a supporting slat having ends received in said first and second slat pockets, said supporting slat and said cross member providing a supporting surface which is substantially parallel with and offset above said bed floor.

5. The pickup truck of claim 1 further comprising:
    a plate secured to said dropgate and providing a pin-receiving bore;

at least one of said end members having an aperture formed therethrough which aligns with said pin-receiving bore when said 'U'-shaped bar is in said operable position; and a lock pin received in said pin-receiving bore and said aperture for releasably securing said 'U'-shaped bar in said operable position.

6. The pickup truck of claim 5 further comprising at least one of said end members having a second aperture formed therethrough which aligns with said pin-receiving bore when said 'U'-shaped bar is in said stowed position, said lock pin received in said pin-receiving bore and said second aperture for releasably securing said 'U'-shaped bar in said stowed position.

7. A cargo support system for a vehicle of the type having first and second sidewalls and a bed, the dropgate cargo support system comprising:

a dropgate articulable from an open position to a closed position and having a support surface formed therein; and a 'U'-shaped bar having a pair of end members, a pair of side members extending from said pair of end members and a cross member interconnecting said pair of side members, said pair of end members being operably coupled to said dropgate for relative pivotal and lateral movement;

said 'U'-shaped bar being releasably securable in a stowed position wherein said 'U'-shaped bar is generally co-planar with said dropgate and in an operable position wherein said 'U'-shaped bar is generally perpendicular to said dropgate and laterally displaced from said stowed position such that at least one of said pair of side members engages said support surface formed in said dropgate.

8. The cargo support system for a vehicle of claim 7, further including at least one roller operably supported to said cross member of said 'U'-shaped bar.

9. The cargo support system of claim 7, wherein said dropgate includes a latch grasping a portion of said cross member when said 'U'-shaped bar is in said stowed position.

10. The cargo support system of claim 7 further comprising a hinge plate disposed over said pair of end members and secured to said dropgate for operably coupling said 'U'-shaped bar to said dropgate.

11. The cargo support system of claim 10 further comprising a lower hinge plate disposed beneath said pair of end members and secured to said dropgate for operably coupling said 'U'-shaped bar to said dropgate.

12. The cargo support system of claim 11 further comprising a bushing placed over said pair of end members and interdisposed between said hinge plate and said lower hinge plate.

13. The cargo support system of claim 10 wherein said hinge plate defines a pin-receiving bore and wherein at least one of said end members has an aperture formed therethrough which aligns with said pin-receiving bore when said 'U'-shaped bar is in said operable position and receives a lock pin for releasably securing said 'U'-shaped bar in said operable position.

14. The cargo support system of claim 13 wherein at least one of said end members has a second aperture formed therethrough which aligns with said pin-receiving bore when said 'U'-shaped bar is in said stowed position and receives said lock pin for releasably securing said 'U'-shaped bar in said stowed position.

15. The cargo support system of claim 7 further comprising a pair of end caps, each of said pair of end caps disposed in a free end of each of said pair of end members.

16. A pickup truck comprising:

a body including a bed, first and second laterally spaced apart sidewalls and a dropgate;

a cargo support system including a 'U'-shaped bar having a pair of end members, a pair of side members extending from said pair of end members and a cross member interconnecting said pair of side members, said pair of end members being operably coupled to said dropgate for pivotal and lateral movement such that said 'U'-shaped bar is releasably securable in a stowed position wherein said 'U'-shaped bar is generally co-planar with said dropgate and in an operable position wherein said 'U'-shaped bar is generally perpendicular to said dropgate and laterally displaced from said stowed position and at least one of said pair of side members engages said support surface formed in said dropgate;

at least one roller operably supported on said cross member of said 'U'-shaped bar;

a first locking mechanism operably disposed between said dropgate and said 'U'-shaped bar to lock said 'U'-shaped bar in said stowed position; and a second locking mechanism operably disposed between said dropgate and said 'U'-shaped bar to lock said 'U'-shaped bar in said operable position.

17. The pickup truck of claim 16 wherein said first locking mechanism comprises a latch grasping a portion of said cross member when said 'U'-shaped bar is in said stowed position.

18. The pickup truck of claim 16 wherein said second locking mechanism comprises:

a plate secured to said dropgate and providing a pin-receiving bore;

at least one of said end members having an aperture formed therethrough which aligns with a pin-receiving bore when said 'U'-shaped bar is in said operable position; and a lock pin received in said pin-receiving bore and said aperture for fixing said 'U'-shaped bar in said operable position.

19. The pickup truck of claim 18 further comprising at least one of said end members having a second aperture formed therethrough which aligns with said pin-receiving bore when said 'U'-shaped bar is in said stowed position, said lock pin received in said pin-receiving bore and said second aperture for releasably securing said 'U'-shaped bar in said stowed position.

20. The pickup truck of claim 16 further comprising first and second slat pockets respectively formed in said first and second laterally spaced apart sidewalls and a supporting slat having ends received in said first and second slat pockets, said supporting slat and said cross member providing a supporting surface which is substantially parallel with and offset above said bed.

* * * * *